Nov. 3, 1931.  E. J. NOBLE  1,830,331

GROUND CLAMP

Filed Sept. 21, 1928

Inventor
Edward J. Noble
By his Attorney
Clarence F. Campbell.

Patented Nov. 3, 1931

1,830,331

UNITED STATES PATENT OFFICE

EDWARD J. NOBLE, OF NEW LONDON, CONNECTICUT, ASSIGNOR, BY DIRECT AND MESNE ASSIGNMENTS, TO GILLETTE-VIBBER COMPANY, INCORPORATED, OF NEW LONDON, CONNECTICUT, A CORPORATION OF CONNECTICUT

GROUND CLAMP

Application filed September 21, 1928. Serial No. 307,483.

My invention relates to an improvement in a ground clamp and the novelty consists in the adaptation and arrangement of parts as will be more fully hereinafter pointed out.

There are many forms of ground clamps on the market and many patented improvements have been made in ground clamps but none of these provide a means of securing a wire mounted in a conduit to a ground whereby there is no open wire connection between the conduit and the ground and which also furnish an exposed end of the grounded wire so that it can be tested to determine if it is actually grounded without disturbing the ground connection.

My device does fulfill these requirements and furnishes a ground clamp in which a wire carried in a conduit is secured by a ground clamp to a ground so that the wire is not exposed except at its very end where it is sufficiently exposed to permit of the testing of the complete ground at any time without disturbing the clamp or connections.

Referring to the drawings Figure 1 is a top plan view of my device showing the complete grounding of a wire carried in a conduit.

Figure 1:
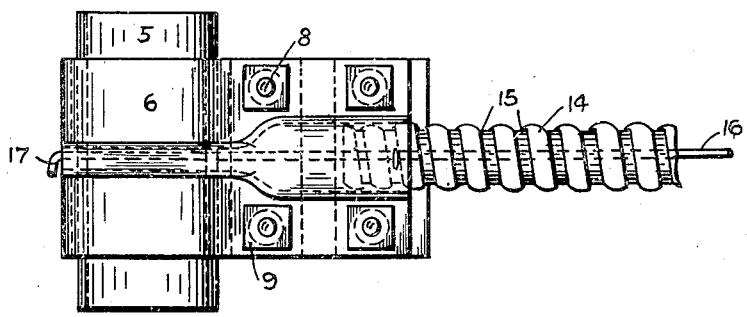
Figure 2:
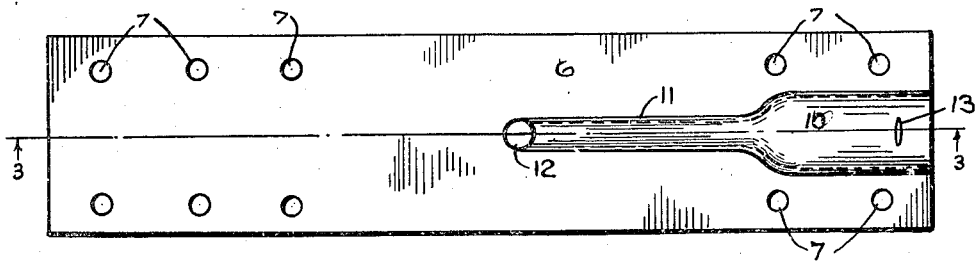
Figure 2 is a top plan view of the clamp member without the fastening means in the flat condition before it is placed upon a pipe to be grounded.
Figure 3:
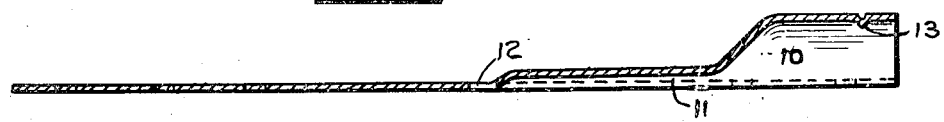
Figure 3 is a longitudinal sectional view of Figure 2 on the line 3—3.
Figure 4:
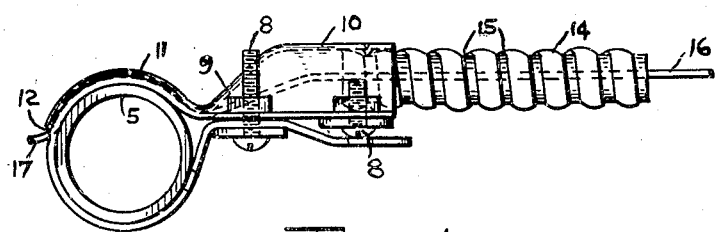
Figure 4 is a side view of Figure 1 showing the wire in dotted outline.

In the drawings 5 is a ground pipe such as an ordinary water pipe which is ordinarily used for the purpose of grounding a wire. 6 is a clamp member having holes 7 cut therein adapted to receive screws 8 which are adapted to be locked in the desired holes 7 by means of nuts 9 in the usual well known manner. A cylindrical housing 10 is made integral with the clamp member 6 which terminates in a cylindrical or curved seat member 11 and the seat member 11 terminates in an opening 12. A raised portion 13 is punched out of the housing 10 and a corrugated conduit 14 of usual flexible construction is adapted to be screwed into the housing 10 by the spiral cut out portions 15 of the conduit 14 engaging the raised member 12 whereby the conduit 14 is rigidly secured in a locked position in the housing 10. A wire 16 carried by the conduit 14 passes through the housing 10 and seats in the grooved seat member 11 and comes out through the opening 12 exposing grounded end 17 of the wire 16.

It will be readily understood that the clamp member 6 is large enough and has sufficient sets of holes 7 to permit of its being secured to any desirable water pipe or other suitable ground and with the conduit 14 readily secured in the housing 10 and the wire 16 seated in the curved seat 11 with the end 17 exposed through the opening 12 and the screws and nuts 9 secured through the desired sets of holes 7 so as to rigidly clamp the clamp 6 on the desired ground 5.

My construction not only permits of the securing of the clamp 6 to varying sizes of ground 5 but also insures the fixed contact of the wire 16 with the ground 5 and furnishes an exposed end 17 of the wire 16 so that its perfect grounding can be readily tested at any time without disturbing the clamp 6.

Many variations may be made in my construction without departing from the spirit and intent of the invention.

I claim:

1. A one piece ground clamp comprising a flexible metal strap having at each end near the edge, correspondingly spaced perforations, and having at one end portion a longitudinally extending relatively large depression merging into a further extending substantially reduced depression.

2. The structure of claim 1 in combination with a grounded conductor and a metallic duct containing a wire to be grounded, in which the strap is bent about the grounded conductor with the ends overlapping and enclosing the end of the said wire in the reduced depression and the end of the duct in the relatively large depression and fastening means in said perforations.

3. A one piece ground clamp comprising a flexible metal strap having at each end near the edge correspondingly spaced perforations, and having at one end portion a longitudinally extending relatively large depression merging into a further extending substantially reduced depression, fastening means in said perforations and means in said relatively large depression for retaining a metallic duct therein.

4. The structure of claim 1 in combination with a grounded conductor and a metallic duct containing a wire to be grounded, in which the strap is bent about the grounded conductor with the ends overlapping and enclosing the end of the said wire in the reduced depression and the end of the duct in the relatively large depression, means for retaining it therein and fastening means in said perforations.

5. A one piece ground clamp comprising a flexible metal strap having at each end near the edge, correspondingly spaced perforations, and having at one end portion a longitudinally extending relatively large depression merging into a further extending substantially reduced depression terminating in an opening.

6. The structure of claim 5 in combination with a grounded conductor and a metallic duct containing a wire to be grounded, in which the strap is bent about the grounded conductor with the ends overlapping and enclosing the end of the said wire in the reduced depression with its end exposed and the end of the duct in the relatively large depression and fastening means in said perforations.

In testimony whereof I affix my signature.

EDWARD J. NOBLE.